United States Patent [19]

Longobardi et al.

[11] Patent Number: 5,046,308

[45] Date of Patent: Sep. 10, 1991

[54] EXHAUST SYSTEM FOR INTERNAL COMBUSTION ENGINES PROVIDED WITH A DEVICE FOR HOUSING FILTERS DESIGNED TO TRAP SOLID PARTICLES AND UNBURNED HYDROCARBONS ENTRAINED IN EXHAUST GASES

[76] Inventors: Roberto Longobardi; Raffaele Longobardi, both of Viale Europa, 2/E, Castellammare Di Stabia 80053, Italy

[21] Appl. No.: 372,373

[22] PCT Filed: Sep. 23, 1988

[86] PCT No.: PCT/IT88/00065

§ 371 Date: May 11, 1989

§ 102(e) Date: May 11, 1989

[87] PCT Pub. No.: WO89/02778

PCT Pub. Date: Apr. 6, 1989

[30] Foreign Application Priority Data

Sep. 25, 1987 [IT] Italy .................. 48420 A/87

[51] Int. Cl.⁵ .............................................. F01N 3/02
[52] U.S. Cl. .................................. 60/311; 55/466;
55/DIG. 30; 60/295; 60/319
[58] Field of Search .............. 60/311, 319, 295;
55/466, DIG. 30

[56] References Cited

U.S. PATENT DOCUMENTS 3,129,078 4/1964 Hobbs .................................. 55/309
4,419,108 12/1983 Frost .................................... 60/311

FOREIGN PATENT DOCUMENTS 2845928 5/1979 Fed. Rep. of Germany .

Primary Examiner—Douglas Hart
Attorney, Agent, or Firm—Darby & Darby

[57] ABSTRACT

The exhaust system is suitable for both gasoline and diesel engines, whether used for vehicle propulsion or in permanently installed power transmissions, and controls emission by trapping the solid matter and unburned hydrocarbons that escape with the exhaust gases using serviceable filters accommodated in an elongated hollow outer case (6,61) sealed at either end by removable caps (7) with axial fittings (10) that connect with the front and rear sections of the exhaust pipe (2,4); the space encompassed by the case (6) is split into two chambers (13,14) of different volume by a baffle (15), one side of which supports a housing (16) designed to contain one or more removable filter elements (19), and at the same time, to combine with the inside wall of the case (6) in creating a void (20) that communicates with the smaller chamber (13) by way of openings formed in the baffle (15).

17 Claims, 2 Drawing Sheets

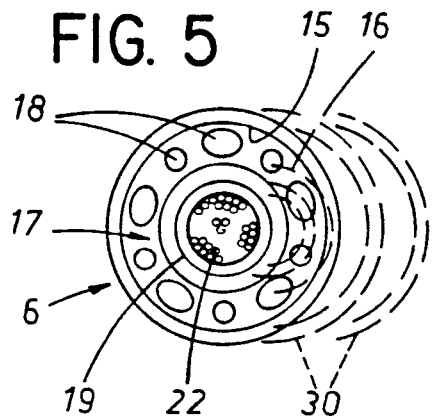
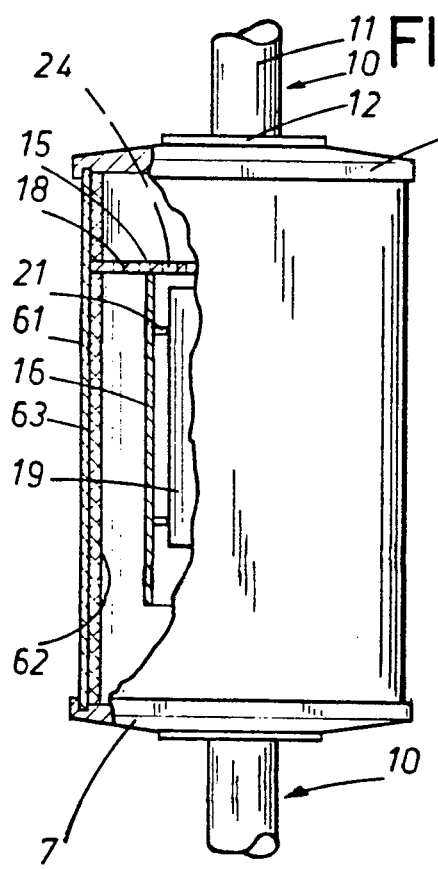
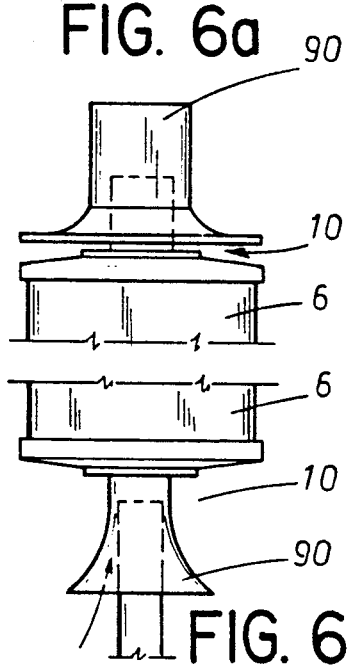
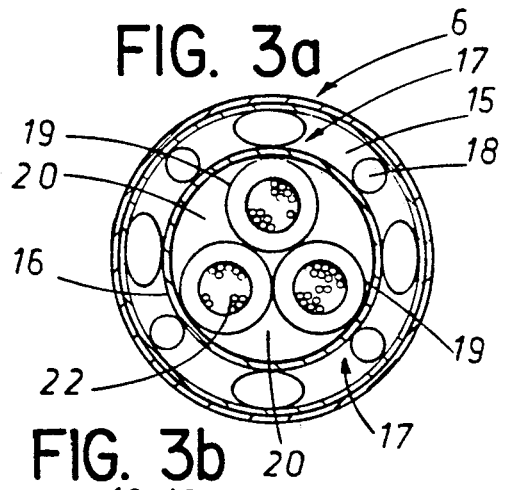
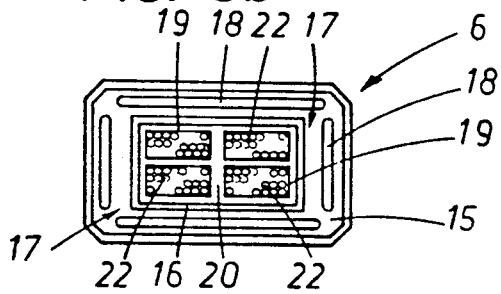

EXHAUST SYSTEM FOR INTERNAL COMBUSTION ENGINES PROVIDED WITH A DEVICE FOR HOUSING FILTERS DESIGNED TO TRAP SOLID PARTICLES AND UNBURNED HYDROCARBONS ENTRAINED IN EXHAUST GASES

DESCRIPTION

The present invention relates to an exhaust system for internal combustion engines, whether fuelled by carburation or injection (Otto cycle petrol engines) or by injection and compression-ignition (diesel), and whether used for the propulsion of vehicles, or as prime movers in permanently-installed domestic, community or industrial power units, and features a device in which to house replaceable filters serving for the abatement essentially of solid particles and unburned hydrocarbons entrained in exhaust gases.

The basic problem tackled by the invention is one generally associated with current research aimed at finding the most effective methods and means of eliminating the main polluting agents from exhaust gases emitted by internal combustion engines.

The polluting agents in question are identifiable in the main as carbon dioxide, hydrocarbons that have escaped combustion, oxides of nitrogen, sulphur and lead, and entrained solid matter or fuel ash, which will be present in proportions that vary according to the different types of engine, and attributable for the most part to less-than-perfect mingling of the air-and-fuel mixture, and incomplete combustion. Attempts to curb pollution have been made thus far in two main directions. On the one hand, research has been concentrated on improving and modifying the carburation, injection and mixing of engine fuels, experimenting with the shape of combustion chambers, valves and passages, and optimizing the combustion cycle; on the other, researchers have recognized the extreme difficulty of creating ideal conditions for combustion and maintaining them constant in the long term, and in the various operating and environmental situations encountered. Accordingly, efforts have also been made to find ways and means, remote from the engine, of reducing emissions to as great an extent as possible.

To this end, thermal reactors have been designed that induce reheat by injecting further fuel and air at suitable temperature; a chemical type of reheat has also been produced by the adoption of catalytic silencers, although these silencers have proven to be effective only against the oxides of carbon and nitrogen and unburned hydrocarbons, whereas rapid deterioration occurs through poisoning of the noble catalyst metal by lead oxides and entrained matter. Diesel engines, in particular, produce exhaust gases in which the concentration of entrained particles is much higher than that of the oxides of nitrogen, and as catalytic silencers cannot be utilized in such a situation, remedies must be sought in improvement of the combustion cycle and regular servicing of the engine.

Finally, attempts have been made to fit a variety of types of filter to the tail-pipe, e.g. wire mesh, fabric, foam, dry or oil-bath etc. . . Such expedients have proved totally unsuitable however, by reason of the rapid rate at which blockage occurs; a blocked filter occasions back-pressure through the exhaust system, and as a result, significant loss of engine output and further deterioration of the combustion cycle.

Accordingly, the main object of the invention is one of remedying the limitations and drawbacks described above by adoption of an exhaust system incorporating a rigidly attached or removable device that is able to accommodate one or more filtered elements, and can be reached from the outside for easy inspection and replacement of the spent elements and/or for general cleaning.

A further object of the invention is to provide a device that is designed, structured and installed in such a way as to guarantee maximum filtration on the part of the filter elements, especially in the case of solid particles and unburned hydrocarbons, and at the same time, to ensure that performance of the engine remains steady and unaffected even with the filters completely spent: in short, that no danger exists of back-pressure being generated through the exhaust system.

Another object of the invention is to provide a filtration device suitable for use with any type of internal combustion engine, but most especially with diesels. Diesel engines currently constitute a major source of pollution mainly by reason of the notable quantity of fuel ash, entrained solids and unburned hydrocarbons emitted with their exhaust gases; the presence of such substances is a principal factor in increasing smoke from the exhaust pipe, at present, the one indicator of a diesel engine's pollution potential that can readily be monitored.

An additional object of the invention is to provide a filtration device that can either be fitted with no difficulty to any given point of an existing exhaust system, or designed permanently or removably into new systems.

Yet another object of the invention is to provide a filtration device designed and structured in such a way as to permit embodiment of an exhaust silencer capable of supplementing or replacing conventional exhaust silencers.

The stated objects, and others besides, are realized by adoption of an exhaust system as characterized in the appended claims. The exhaust system according to the invention comprises a device that consists in a hollow outer case, enclosed at its ends by removable caps that incorporate fittings for axial connection to the exhaust pipe, the inside of which is divided by a baffle into two chambers of dissimilar volume, the larger chamber accommodating a housing, rigidly associated with the baffle, in which one or more serviceable filter elements are lodged; the outside of the housing and the inside of the case combine to create a passage that communicates with the smaller chamber by way of openings in the baffle.

The invention will now be described in detail, by way of example, with the aid of the accompanying drawings, in which:

FIGS. 3a and 3b are each a section through 3a—3a in FIG. 2 in two possible embodiments;

FIG. 4 is a partially broken longitudinal view of the device shown in FIG. 2, seen partly in longitudinal section, illustrating its operation as an exhaust silencer;

FIG. 5 is a section view taken as in FIG. 3a but of a schematic illustration of a further embodiment of the invention, in which the filtration device is accessible from the side;

FIGS. 6a and 6b are partial longitudinal views of an additional feature of the invention respectively showing two different methods for their incorporation into the exhaust system.

Figure 1:
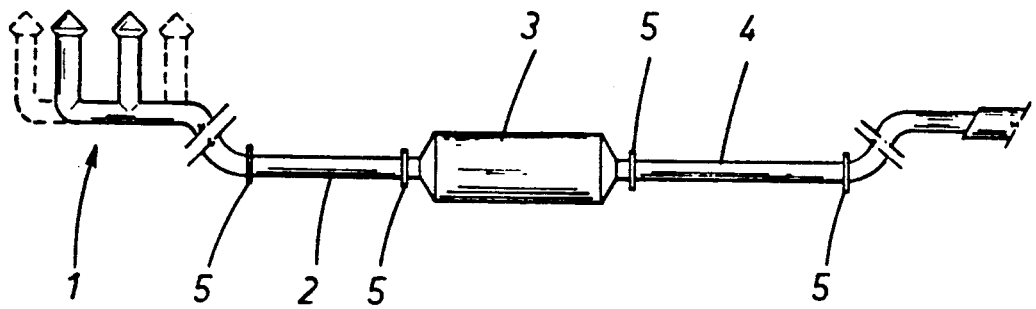
FIG. 1 is the schematic representation of a typical conventional exhaust system.

With reference first to FIG. 1, of the above drawings, there is an exhaust manifold 1, in its entirety, from which gases expelled by the combustion chambers of a petrol or diesel engine are directed through a first pipe 2 into a silencer 3 and out ultimately by way of a second pipe 4 into the surrounding atmosphere. These single parts make up a typical exhaust system, and are connected one to the next at a number of points, denoted 5 in FIG. 1; a filtration device according to the invention can be fitted at any one these points 5.

Figure 2:
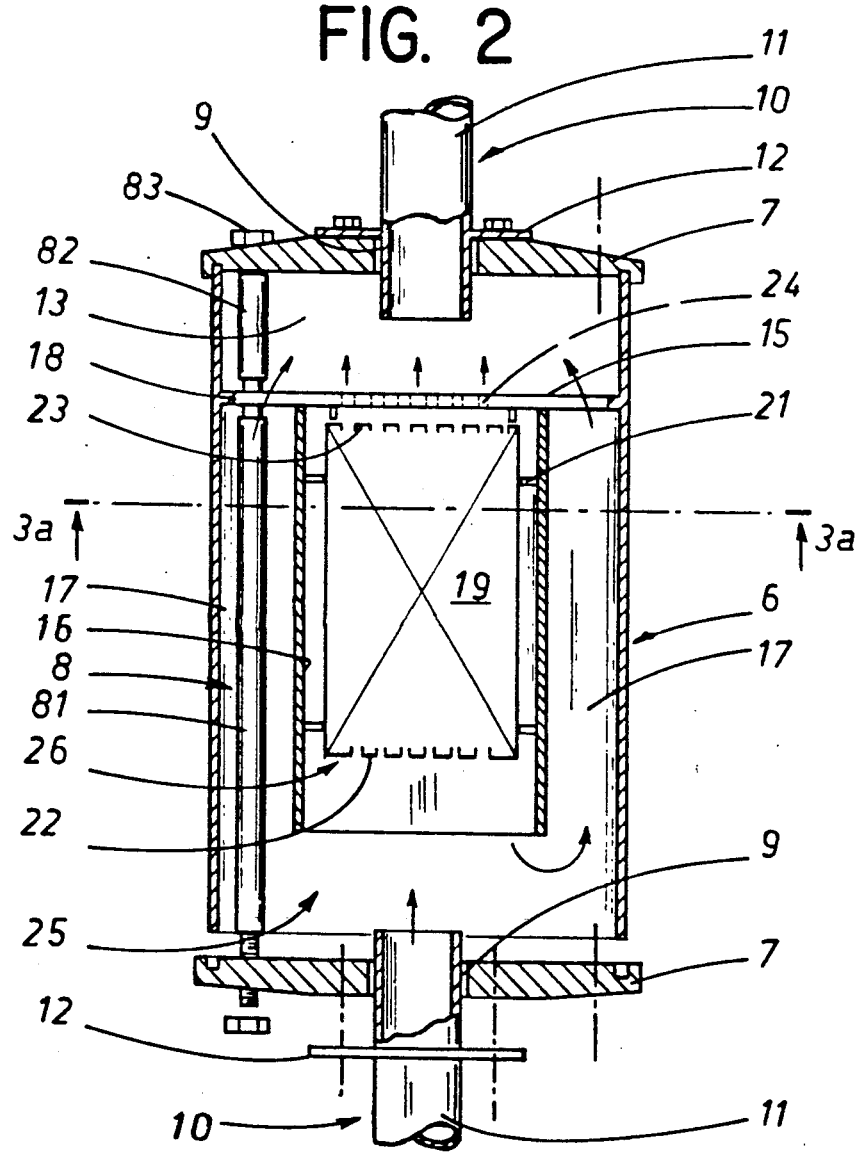
FIG. 2 is a longitudinal section through a preferred embodiment of the filtration device according to the invention.

FIG. 2 affords a view of the device in longitudinal section. 6 denotes a hollow outer case with open ends that are sealed tight by two substantially identical caps 7 clamped in place rigidly, though removably, by conventional means denoted 8; in the example illustrated, such means 8 consist in a set of fasteners each comprising a tension rod 81 with relative sleeves 82 and nuts 83, though other types of removable clamp might equally well be adopted. Each cap 7 affords a opening 9 at center, serving to accept a respective fitting 10 by which the device is connected axially to the manifold 1 and/or to the first pipe 2, the silencer 3, or the second pipe 4. Each fitting 10 consists essentially in a tube 11, integral with a flange 12, that slots through the cap 7 and can be rigidly and hermetically fastened to it, the flange 12 being distanced from the end of the tube 11 in such a way as to limit the passage of the fitting through the opening 9, as discernable from FIG. 2. The single fitting 10 can be associated with the cap 7 detachably, adopting conventional fasteners, in such a way as to enable the filament of interchangeable tubes 11 manufactured in different sizes with diameters to match the various production diameters of the ends of the manifold 1, pipe 2, 4 or silencer 3 to which they must be connected and clamped at the selected points 5. Alternatively, the filtration device may be designed into new exhaust systems, in which case the tubes 11 will coincide with and form an integral part of the manifold 1 or pipes 2, 4 or silencer 3, and the flange 12 will be either integral with, or indeed replaced altogether by the cap 7.

The space encompassed by the case 6 is divided into two chambers 13 and 14 of dissimilar volume by a baffle 15, disposed transversely to the axis of the outer case 6 and made fast to it peripherally either in permanent or removable fashion, depending on a alternative requirements shortly to be described. 16 denotes a hollow housing, rigidly associated with and supported by the side of the baffle 15 directed toward the chamber 14 of greater volume, which is disposed coaxial with the case 6 and remains open at the end farthest from the baffle 15. The external surface of the housing 16 and the internal surface of the case 6 combine to create a peripheral void 17 encircling the housing and similarly open at the end farthest from the baffle 15; the opposite end of the void 17 communicates with the chamber 13 of lesser volume by way of a plurality of openings 18 in the corresponding peripheral part of the baffle 15.

The housing 16 accommodates an axially disposed, removable filter element 19 held in position by conventional retaining or fastening means that are not illustrated in FIG. 2 for simplicity's sake. The filter element 19 is accommodated in such a way that an annular passage 20 exists between its own outer surface and the inner surface of the housing 16, thereby interconnecting the two ends of the housing. The passage 20 is created by expedient positioning of the filter element 19 inside the housing 16, for example achieved by the incorporation of studs 21 designed to distance the element from the inside wall of the housing. An alternative method (not illustrated in the interests of simplicity) might be to create the passage 20 by embodying the filter element 19 with a suitably profiled outer surface, affording projections that locate against the inside wall of the housing 16.

The filter element 19 is installed with one end 22 suitably perforated and positioned at the open end of the housing 16 to take in the exhaust gases, and it opposite end 23, similarly perforated to permit expulsion of the filtered gases, breasted against the baffle 15, which constitutes the base of the housing 16.

The drawings illustrate two alternative methods of embodying the baffle 15, each designed with a given end in view (shortly to be described): whatever the geometry selected, the central area can either be left solid, or provided with a plurality of holes 24 evenly distributed over an area matching that of the adjacent end 23 of the filter element 19.

The embodiment illustrated in FIG. 2 assumes the use of a single filter element 19 only; nonetheless, the option clearly exists of modifying the housing 16 slightly to accept more than one element, arranged in such a way to ensure optimum exploitation of the available space and creating passages 20 of varying shape, distribution and width, as in FIGS. 3a and 3b, which show two possible multi-element arrangements viewed across A—A in FIG. 2.

In the preferred embodiment of FIG. 2, the device is embodied with a cylindrical outer case 6 and filter housing 16 that exhibit circular cross section, and circular caps 7 and baffle 15, though here too, the option exists of adopting a case 6 and housing 16, say, prismatic in shape with a quadrangular cross section as shown by way of example in FIG. 3b, or indeed of selecting other geometry and combinations that are not illustrated in the drawings.

In effect, the geometry will be dictated ultimately by structural factors influencing the efficiency of the device, which are shortly to be described. The open end of the housing 16 is positioned at a given distance from the corresponding end of the coaxial outer case 6 and the relative cap 7, in such a way as to create a terminal void 25 essentially similar to the smaller chamber 13, but no greater in volume.

To best advantage, the filter element 19 will occupy almost the total length of the housing 16, stopping short of its projecting open end in such a way that an intake 26 is created, serving to admit the gases requiring filtration and channel them into the inlet end 22 of the element.

Finally, if the device is to operate efficiently, it is essential that cross sectional area downstream of the peripheral void 17, i.e. the passage afforded to the gases escaping through the baffle openings 18, be no less than that of the manifold 1 and/or the first and second pipes 2 and 4.

In operation, post-combustion gases expelled through the exhaust manifold 1 enter the terminal void 25 at normal exhaust pressure and are directed toward the inlet end 22 of the filter element 19, assisted by the extension of the connecting tube 11 into the void 25 and toward the intake 26, as indicated by the arrows in FIG. 2. In optimum running conditions, the greater part of the gases will pass through the filter 19, and while turbulence causes the remainder to flow directly through the peripheral void 17 and the baffle openings 18, a sufficiently wide passage is afforded by this route to ensure that there will be no back-pressure generated through the system. Gases filtered by the element 19 emerge from the outlet end 23, passing through the holes 24 in the center of the baffled 15 and into the smaller chamber 13 to rejoin the flow through the holes 18, before leaving the device ultimately by way of the rear fitting 10. In the event of the filter 19 becoming totally blocked, gases will continue to by-pass the housing through the peripheral void 17, as well as flowing straight through by way of the passages 20 and the holes 24.

Where the center of the baffle 15 is solid, filtered gases leaving the outlet end 23 of the element 19 will return toward the inlet end 22 through the passages 20 and then leave the device by way of the peripheral void 17.

A device structured according to the foregoing description provides the following advantages:

the passage offered to the exhausting gases remains of constant cross sectional area in any conditions, keeping losses in engine output within the limits specified for conventional exhaust systems;

the greater part of the gases requiring filtration find their way through the filter elements;

the exhaust gases are obliged to follow a tortuous route through several chambers and changes in cross sectional area, compressing and expanding by turns; accordingly, cooling is favoured, the formation of nitrogen oxides is attenuated, and with velocity of the gases reduced, heavier pollutant solids are able to precipitate more easily.

These environmental and propulsion advantages are enhanced by the practical bonus of a filter housing that is easily opened up and inspected simply by undoing the fasteners 8; the element 19 is therefore easy to replace, and the inside of the housing 16 easy to clean, albeit the accumulation of dirt has no adverse effect whatever on engine performance. A further advantage of the device is that the system of chambers and passages, referred to above, brings about the deflection of sound waves generated by the pressure loss from the flow of exhaust gases; this signifies that noise levels can also be reduced, and accordingly, that the device will also function as a silencer. To this end, the structure of the outer case 6 is embodied advantageously as a double wall 61 (FIG. 4) extending substantially its entire length; in the example illustrated, the inner wall 62 of the two is uniformly perforated, and a layer of sound absorbent material 63 sandwiched between the two walls has the effect of reducing noise levels still further.

Thus embodied, the filtration device disclosed can serve as a combined exhaust silencer-and-filter, either supplementing or replacing the conventional silencer 3 in an existing system.

A further embodiment of the invention, relating to new exhaust systems manufactured with the filtration device built-in, and applicable once the geometry has been optimized to suit a given type of engine, consists in fitting one or more of the openings 18 in the baffle 15 with shut-off means, or relief valves (not illustrated); such means would serve to admit the flow of gases from the peripheral void 17 into the smaller chamber 13 only when a given level of exhaust pressure has been reached internally of the void 17 itself. The purpose of this expedient is to encourage passage of the gases through the filter element 19, and provide a greater measure of control over exhaust velocity and pressure, since these are parameters that can be exploited to control velocity and pressure of the gas upstream, at the engine's exhaust valves, providing an indirect adjustment of the combustion cycle aimed at reducing the formation of pollutants during combustion.

In a preferred embodiment of the exhaust system, the filtration device will incorporate a substantially funnel-shaped air intake 90 associated with one of the axial fittings 10, arranged in such a way as to enable dilution of the exhaust gases either before or after filtration by exploiting a velocity-induced vacuum to draw clean air into the system 1 from the surrounding atmosphere. Where dilution is effected prior to filtration, as in FIG. 6a, the exhaust gases can be cooled and filtered more efficiently; when effected post-filtration, as in FIG. 6b, particularly in systems where the filtration device is located at the tail end, the gases not only cool more quickly, but mingle with oxygen and disperse much faster.

In the preferred embodiment referred to throughout the description, inspection and servicing of the filter element 19 is permitted by removing one of the end caps 7; with a bare minimum of modification to the retaining and fastening arrangements however, a removable cover 30 might be incorporated into one side of the outer case 6 so as to afford a lateral access point through which the filter elements 19 can be extracted, with or without their housing 16. The housing might in fact be made detachable at the baffle 15 simply by incorporating a suitably shaped socket into the internal surface of the case 6, as illustrated schematically in FIG. 5.

The filter elements 19 might incorporate a number of different filtering materials layered in succession -viz, porous resin, mesh, wire wool, fabric, flock, foam, etc., dry or oil-bath, which would be selected in a combination able to trap the highest possible quantity of entrained solid particles and unburned hydrocarbons, compatible with an acceptable working life.

We claim:

1. An exhaust system for internal combustion engines provided with a device for housing filters designed to trap solid particles and unburned hydrocarbons entrained and dissolved in exhaust gases, of the type comprising exhaust components which include an exhaust manifold, a first pipe, at least one silencer and a second pipe, the exhaust manifold being connected by way of the first pipe and the silencer to the second pipe from which the gases are ultimately exhausted, the exhaust system being suitable for use with petrol and diesel engines, comprising:

a device, located at any given point along the system, having an axially hollow outer case with open ends which are sealed tight by rigidly attached and substantially identical caps each affording an opening at a center thereof, each of said caps serving to accept a respective hermetically attached fitting by which the device itself is connected axially to one of the exhaust components;

the case encompassing a space that is divided internally into two chambers of dissimilar volume by a baffle that is disposed traversely and fastened peripherally to the case, said space accommodating a hollow housing rigidly associated with and supported by the side of the baffle and directed toward the chamber of greater volume and open at the end farthest from the baffle, said hollow housing being disposed coaxial with the case in such a way that an external surface of said hollow housing and the internal surface of he case combine to create a peripheral void that is open at an end which is farther from the baffle and able to communicate at the remaining end with the chamber of lesser volume by way of a plurality of openings in a corresponding peripheral part of the baffle, the housing accommodating at least one removable filter element disposed axially and held in position in such a way that a passage interconnecting two ends of the housing is crated between an outer surface of the filter element and the inner surface of the housing and such that an end of the filter element designed to admit the exhaust gases is located at the open end of the housing, and another end of the filter element from which filtered gases are expelled is breasted against the baffle and against the base of the housing;

the open end of the housing being located at a given distance from the corresponding end of the coaxial outer case and the respective cap creating a terminal void of similar shape to the smaller chamber but no greater volume in such a way that gases exhausted from the engine are admitted by way of one fitting into said terminal void and expelled following filtration by way of the smaller chamber and the other fitting which is remaining; and the total cross-sectional area offered to gases exhausting through the peripheral void and the corresponding openings in the baffle being at least equal to that of any one of the exhaust components.

2. An exhaust system as in claim 1, wherein the baffle has a central portion which has a plurality of holes uniformly distributed over a surface area matching that of at least an adjacent end of said at least one filter element accommodated by the housing.

3. An exhaust system as in claim 1, wherein the one fitting has a tube insertable through the opening of a respective cap and integral with a flange that is matched to the shape of the cap, said cap being attachable rigidly and hermetically thereto and distanced from the end of the tube in such a way that the tube projects a given distance into any one of the terminal void and the chamber of lesser volume when inserted through the cap.

4. An exhaust system as in claim 3, wherein the tube of the one fitting exhibits a cross section of diameter that matches the diameter of the ends of the exhaust manifold and the first and second pipes to which they are connected and rigidly attached.

5. An exhaust system as in claim 3, wherein the tube of the one fitting coincides with and forms an integral part of one of the exhaust components.

6. An exhaust system as in claim 1, wherein said at least one filter element is accommodated by the housing in a set position established by projections issuing from said at least one inside wall and the base of the housing in such a way as to create said at least one passage interconnecting the ends of the housing.

7. An exhaust system for as in claim 1, wherein the passage interconnecting the ends of the housing are created by embodying the external surface of the filter element with projections that interact one with the other and with the inside wall and base of the housing.

8. An exhaust system as in claim 1, wherein the filter element occupies almost the total length of the housing, stopping short of the open end toward the chamber in such a way that an intake is created, serving to admit the gases requiring filtration and to channel the gases into the inlet end of the filter element.

9. An exhaust system as in claim 1, wherein at least one of the openings in the periphery of the baffle is fitted with means for admitting the flow of gases from the peripheral void into the smaller chamber whenever a given level of exhaust pressure registers through the void.

10. An exhaust system as in claim 1, wherein the hollow outer case of the filtration device is embodied with a double wall structure extending substantially its entire length, comprising a uniformly perforated inner wall and a layer of sound absorbent material sandwiched between the two walls so that the case, caps and fittings, together with the housing and the filter element will also function as a silencer.

11. An exhaust system as in claim 1, wherein the caps of the device are clamped rigidly to the hollow outer case by conventional fastening means, embodied removably in order to permit of gaining access to the housing from the outside and thus enable inspection or replacement of the one filter element contained therein, and of effecting routine service and cleaning operations.

12. An exhaust system as in claim 1, wherein one side of the hollow outer case affords a service cover that can be opened and tightly reshut, thus providing a lateral access point through which the one filter element may be removed, even with the housing and even without the housing for replacement and cleaning purposes.

13. An exhaust system as in claim 1, wherein the filtration device is embodied with said cylindrical outer case, and accordingly, with said caps and said baffle that are circular when seen in plan.

14. An exhaust system as in claim 1, wherein the housing of the filtration device is cylindrical and exhibits a circular cross section.

15. An exhaust system for as in claim 1, wherein the filtration device comprises an air intake associated with one of the fittings and arranged in such a way as to enable dilution of the exhaust gases by exploiting the vacuum generated in the wake of the exhausting gases to draw air into the system from the surrounding atmosphere.

16. An exhaust system as in claim 15, wherein the air intake is arranged to enable dilution of the gases before filtration.

17. An exhaust system as in claim 15, wherein the air intake is arranged to enable dilution of the gases after filtration.

* * * * *